United States Patent Office 3,540,899
Patented Nov. 17, 1970

3,540,899
BASIC FUSED REFRACTORY MATERIAL
Allen M. Alper, Corning, Robert C. Doman, Painted Post, and Robert N. McNally, Corning, N.Y., assignors to Corhart Refractories Company, Louisville, Ky., a corporation of Delaware
No Drawing. Filed Dec. 26, 1967, Ser. No. 693,167
Int. Cl. C04b 35/04, 35/06
U.S. Cl. 106—58         13 Claims

ABSTRACT OF THE DISCLOSURE

Fused refractory material consisting of, analytically by weight, 38 to 85% CaO, 10 to 59% MgO, at least 80% CaO plus MgO, 0.15 to 11.5 fluorine, 0 to 10% oxide selected from $Cr_2O_3$ and/or $Fe_2O_3$, 0 up to less than 7% $SiO_2$, and 0 up to less than 10% $Al_2O_3$. Fluorine provides increased hydration resistance and, in presence of $Cr_2O_3$ and/or $Fe_2O_3$, increased resistance to thermal shock and to thermal gradient stresses. At least 0.5% by weight $Cr_2O_3$ and/or $Fe_2O_3$ yields higher bulk density.

FIELD OF THE INVENTION

The invention pertains to improvements in chemically basic refractory material of the dolomite type having, as its chief constituents, CaO and MgO each in substantial amounts centered around or in the neighborhood of the eutectic composition and totalling at least 80% by weight. Refractory material of this general nature is recognized as suitable for forming the inside working linings of basic steelmaking furnaces or vessels where such linings must withstand the severe corrosive effects of the chemically basic molten slags, slag vapors and other molten steelmaking ingredients. More specifically, the invention is concerned with completely melted and resolidified mixtures of appropriate raw materials, principally dolomite (or the equivalent combination of lime and magnesia) with or without additions of magnesia or lime, to yield a CaO-MgO base fused product or material, either as a fused cast monolithic article or as fused grain that can be rebonded to form bricks or other structural bodies.

DESCRIPTION OF THE PRIOR ART

As early as 1881, Jacob Reese proposed (in his U.S. Patent 249,548) melting and resolidifying dolomite into fused cast bodies for lining basic steelmaking or other metallurgical vessels. A similar proposal was made by Sudre and Thierry in their U.K. patent specification 1,491 of 1901. This same concept, with or without additions of magnesia or lime, was again put forth by Sprenger in his unaccepted U.K. patent specification 340,958. Sprenger further suggested additions, in unspecified amounts, of chromic oxide, alumina and silica to the dolomite charge in order to provide improved hydration resistance characteristics in the fused products, apparently similar to the results earlier obtained by such additions to burned, but unfused, dolomite refractory material. Sullivan proposed, in his U.S. Patent 2,113,818, a fused cast mixture of dolomite and silica to yield a more easily melted and cast product by virtue of a 5% minimum $SiO_2$ content. Sullivan also suggested 2 or 3% or more of iron and aluminum oxides in the mixture to provide some stabilization of the fused product against hydration deterioration. McMullen proposed, in his U.S. Patent 2,310,591, providing a CaO-MgO base fused cast refractory with at least 5% of alumina and/or iron oxide for improved resistance to hydration, spalling and slag corrosion.

Despite all the foregoing proposals plus the fact that dolomite is a relatively much less expensive basic refractory raw material, no apparent practical fused cast articles or bricks have been commercially made and used in any significant amounts over the years. Our work, in following the prior art proposals, suggests that this historical result has occurred due to severe deficiencies in such fused cast products that render them practically unsuitable for basic steelmaking furnace linings and some other applications. For example, fusion casting dolomite (with and without additions of magnesia) by our ordinary practices for basic materials yielded fused cast blocks with very poor bulk density. Almost all of these blocks had extremely "punky" macrostructures throughout most of their volumes, particularly in the large central portions or cores. Such "punky" macrostructures were characterized by large amounts of very sizeable macroporosity, which tended to form a sponge-like appearance or to somewhat resemble the macrostructural appearance of Swiss cheese. Such large volumes of porosity were found to allow more rapid penetration and corrosive attack by molten slag and other steelmaking ingredients, thereby nullifying to a substantial degree the inherent good corrosion resistance of the CaO-MgO base fused refractory that would have otherwise been operative if the bodies were much more dense.

One way we found to overcome the foregoing porosity problem was by adding chromic oxide and/or iron oxide (e.g. both in the form of chrome ore) in small amounts totalling from about 0.5 to 10%. While larger amounts were found to also overcome the porosity problem, they were found to be seriously detrimental to the corrosion resistance to the point of causing the fused product to be impractical for lining basic steelmaking furnaces. Nevertheless, the noted small amounts caused the cast bodies to be very dense and to be substantially free of the above described macroporosity (except, of course, for the usual central pipe void that naturally occurs in the upper portions of fused cast crystalline oxide bodies due to the inherent shrinkage effect during solidification, but the pipe void can be substantially eliminated by suitable techniques, e.g. supplying additional molten refractory as described in U.S. Patent 1,700,288, whereas the macroporosity cannot be so eliminated). Such dense fused bodies were found to have materially better basic slag corrosion resistance than the earlier ones with high porosity; however, they were found to have very poor resistance to thermal shock and to temperature gradients through them in contrast to the good resistance to the same factors possessed by the high porosity cast bodies. Such poor resistance to these thermal conditions renders these dense bodies unsuitable for service in basic steelmaking vessels or furnaces, especially those involving one of the modern oxygen blowing processes, where the refractory lining is subjected to considerable thermal gradients through such lining. Obviously, the greater corrosion resistance afforded by the more dense structure is of no real value if the refractory lining spalls apart and breaks up at an early stage due to thermal stresses. The overall general result is the same: rapid deterioration of the refractory lining necessitating more frequent and uneconomical lining repair and replacement. It is not surprising, then, that either other basic fused cast refractory materials with higher initial cost or various basic bonded refractory materials have been commercially employed where these other refractories were considered to give a much lower ratio of refractory cost per ton of metal (e.g. steel) produced. Unless any different or new refractory material possesses performance characteristics that render the cost ratio substantially equal to or lower than that for presently employed refractory materials, such different or new refractory material is essentially impractical and useless for lining the metal producing furnaces.

As a further observation concerning the chromic oxide and/or iron oxide modified CaO-MgO base fused refractory material, despite Sprenger's teaching that such modifications will improve hydration resistance, we have found that these dense modified fused refractory materials still suffer from a very undesirable sensitivity to and rate of hydration deterioration. Of course, this factor substantially contributes to materially increasing the cost ratio due to material disintegration and loss in storage and/or transit, and due to the extra expense of special protection efforts (e.g. sealing the refractory inside a plastic sheet cover or bag).

It has also been proposed by two of the present applicants, in their U.S. Patent 3,250,632, to make a MgO-base fused cast refractory containing a high MgO content of at least 50% or more and a substantial retained fluorine content. It can contain CaO but only in amounts less than 35%. Notably, this fused product was also susceptible to significant hydration deterioration, especially when the fluorine content was derived from a calcium fluoride in the batch material. One or more of several oxide additives are prescribed to insure good hydration resistance of the fused product so that it can survive transport and storage prior to service in a basic steelmaking furnace or the like.

SUMMARY OF THE INVENTION

We have discovered that the inclusion of a substantial retained fluorine content, even when derived from a $CaF_2$ addition, in a dolomite type of CaO-MgO base fused refractory material will greatly improve its hydration resistance. Moreover, we have further discovered that the resistance to thermal shock and to temperature gradient stresses exhibited by dense dolomite type of CaO-MgO base fused refractory material containing the chromic oxide and/or iron oxide additions is also greatly improved by the inclusion of a substantial retained (or analytical) fluorine content in the fused product. Based on our research data, we define the basic fused refractory material invention broadly as analytically consisting of, by weight, 38 to 85% CaO, 10 to 59% MgO, at least 80% CaO plus MgO, 0.15 to 11.5% fluorine (retained), 0 to 10% of densifying oxide selected from the group consisting of $Cr_2O_3$, $Fe_2O_3$ and mixtures thereof, 0 up to less than 7% $SiO_2$ and 0 up to less than 10% $Al_2O_3$. While all compositions within this broadly stated area have generally good resistance to attack by basic metallurgical slags, such resistance tends to be increased as the MgO content is increased up to the 59 wt. percent limit. Compositions with greater than 59 wt. percent MgO show no significant further increase in basic metallurgical slag corrosion resistance and, furthermore, have a much stronger tendency to form punky cores in the fused products. In addition to the benefits mentioned above, the addition of fluorine to the dolomite type of CaO-MgO base fused refractory material lowers its melting point somewhat so as to make it more easily manufacturable, i.e. more molten material can be formed with a given amount of electrical power used in melting and the molten material is more easily cast into molds so as to substantially completely fill them up to form the desired product defined by the mold cavity. However, it is important to limit the retained fluorine content within reasonable bounds to avoid severely reducing the refractoriness and the basic corrosion resistance of the product. Such adverse effects are especially notable when the retained fluorine content exceeds 11.5 wt. percent. In the latter situation, the excessive fluorine content results in the formation of an undesirable amount of lower melting point fluoride phase throughout the fused body. The amount of densifying oxide is limited to 10 wt. percent for substantially the same reason. The inclusion of $Cr_2O_3$ and/or $Fe_2O_3$ also lowers the melting point somewhat and, as such oxide begins to approach a content of 10 wt. percent, a lower melting point phase begins to appear in the microstructure. In cases where the densifying oxide was provided by additions of chrome ore, this lower melting point phase has been tentatively identified as $Ca_2MgFe_2O_6$ solid solution. Beyond 10 wt. percent, the densifying oxides form greater undesirable quantities of the detrimental lower melting point phase or phases that substantially diminish the essential refractoriness of the basic fused product. The $SiO_2$ is generally a tolerated impurity in the amounts stated. Although it may contribute to the ease of manufacturing by somewhat lowering the melting point of a given composition, it is usually desirable to minimize the $SiO_2$ content by keeping it below 3% by weight or even lower. Ordinary dolomite or other raw materials will contribute some small amount of $Al_2O_3$ to the composition, but further deliberate small additions can be made so long as the total $Al_2O_3$ content is less than 10% in order to avoid the detrimental formation of excessive low melting point phase or phases (e.g. aluminate, etc.).

The improved hydration resistance benefits of the retained fluorine are not dependent upon the presence of the densifying oxide and the latter oxide can be completely omitted when a more porous product is desired or can be tolerated for some industrial applications, e.g. insulating refractory. Such products made without the densifying oxide are found to have bulk densities mainly ranging from 170 to 190 pounds per cubic foot. These more porous fused products have a very substantial resistance to thermal shock and to temperature gradient stresses even without the addition of retained fluorine, and the addition of retained fluorine in the more porous products has not been found to contribute any significant improvement in these properties. However, when a more dense product is desired and needed, an addition of at least 0.5 wt. percent of $Cr_2O_3$ and/or $Fe_2O_3$ must be made to the product and this inherently severely reduces the resistance to thermal shock and thermal gradient stresses. In these situations, the retained fluorine addition mitigates such loss in thermal resistance properties to a very considerable degree. Thus, it is possible to make a more dense product, mainly ranging from 195 to 210 pounds per cubic foot in bulk density, that is also capable of withstanding severe thermal conditions to a very reasonable degree. This greater bulk density also makes it possible to obtain substantially the full benefit of the inherent resistance of fused dolomite type material to corrosion by chemically basic molten substances, such as the ingredients processed in LD, Kaldo or other basic oxygen steelmaking furnaces.

Although a fairly reasonable refractory product with improved hydration resistance can be obtained with as much as 11.5 wt. percent retained fluorine, such products are not particularly suitable in contacting environments of chemically basic materials, such as occurs in basic oxygen steelmaking processes. Above 7 wt. percent retained fluorine, it has been found that corrosion resistance markedly decreases with increasing retained fluorine content, whereas only minor lowering of basic slag corrosion resistance occurs with 7 wt. percent or less of retained fluorine. Moreover, increasing retained fluorine contents provide increasing resistance to thermal shock and/or thermal gradients only up to about 7 wt. percent retained fluorine and beyond that content, no further increasing benefit in these thermal properties is observed. The higher retained fluorine contents also appear to reduce the room temperature and elevated temperature strength of the fused body. When the retained fluorine content exceeds 7 wt. percent, the values of modulus of rupture in flexure at room temperature and at 1000° C. usually range between about 2500 to 4000 p.s.i. Fused bodies with 7 wt. percent or less of retained fluorine exhibited room temperature modulus of rupture values usually ranging between about 3000 to 12,000 p.s.i. and modulus of rupture values at 1000° C. usually ranging between about 2000 to 6000 p.s.i. It is apparent from such property data that the retained fluorine content needs to be limited to a maximum of 7 wt. percent for fused material that is to be employed as refractory linings in basic steelmaking furnaces. Also for such purposes, at least 0.3 wt. percent retained fluorine should be employed in order to obtain significant improved resistance to thermal shock and thermal gradients.

The most notable retained fluorine range of 0.3 to 7% by weight is observed to actually embody two distinct areas with different property emphasis. Peak improvements in hydration resistance are observed to generally occur in the range of 0.5 to 1.5 wt. percent retained fluorine and, as a more general rule, optimum hydration resistance is attained by providing retained fluorine contents in the range of 0.3 to 3% by weight. Additionally, this more restricted range of fluorine also provides optimum strength values at room temperature. For example, in one series of fused samples, those with 3% or less of retained fluorine yielded modulus of rupture values ranging between about 4000 and 12,000 p.s.i. while those samples with more than 3 wt. percent, but not more than 7 wt. percent, of fluorine yielded modulus of rupture values only ranging between about 3000 and 9000 p.s.i. Another significant aspect of the 0.3 to 3 wt. percent fluorine range is that it provides optimum basic slag resistance when utilized in conjunction with the densifying oxide additions. It has only been with this more restricted fluorine content range that basic slag corrosion resistance values have been distinctly superior to those of the fused cast mixtures of magnesia and chrome ore that have been finding increased commercial usage in basic oxygen steelmaking furnace during the past decade. On the other hand, sample bodies containing in excess of 3 wt. percent and up to 7 wt. percent (or even up to 12 wt. percent) of retained fluorine, in conjunction with the addition of densifying oxides, exhibit the optimum improvement in resistance to thermal shock or to temperature gradient stresses. This higher retained fluorine content range would be more appropriate where the fused refractory material was to be employed in an industrial application requiring more emphasis on the resistance to thermal shock or stresses rather than basic slag corrosion resistance of the refractory materials.

A particularly preferred composition area for refractory material according to this invention produced from substantially all dolomite raw material is as follows, analytically by weight: 50 to 75% CaO, 10 to 48% MgO, at least 91% CaO plus MgO, 0.3 to 7% fluorine, 0 to 8% of $Cr_2O_3$ and/or $Fe_2O_3$, 0 to 2% $SiO_2$, and 0 up to less than 3% $Al_2O_3$. Our experience indicates that compositions in this area give the greatest density and least tendency toward punky core difficulties. Moreover, they have good melting characteristics and are easily formed or cast into molds. Using substantially pure grades of $Cr_2O_3$ and/or $Fe_2O_3$, particularly good basic slag corrosion resistance is obtained with such oxides amounting to 0.5 to 4 wt. percent analytically in the fused product. It is especially desirable to add chrome ore as the source of these two densifying oxides in combination. The latter additional batch material provides the best basic slag corrosion resistance when yielding 0.5 to 4 wt. percent $Cr_2O_3$ and 0.2 to 4 wt. percent $Fe_2O_3$ in the fused product.

By adding some magnesia to dolomite to form the raw batch material, somewhat greater basic slag corrosion resistance can be obtained. An especially preferred composition area attainable with such mixture of raw batch materials is as follows, analytically by weight: 38 to 65% CaO, 30 to 58% MgO, at least 91% CaO plus MgO, 0.3 to 7% fluorine, 0 to 5% $Cr_2O_3$ and/or $Fe_2O_3$, 0 up to less than 3% $SiO_2$, and 0 up to less than 3% $Al_2O_3$. The samples with the best basic slag corrosion resistance in this composition area were determined to contain one or a combination of the following: 0.6 to 3 wt. percent $Cr_2O_3$ and 0.5 to 2 wt. percent $Fe_2O_3$.

Our new fused refractory material can be made by conventional practices, including melting of premixed batch charges in an electric arc furnace and either casting the molten material into suitable preformed molds (e.g. graphite slab lined molds backed up with annealing powder in metal containers) or directly forming it into grain. Of course, as in the past, the mold can also be the furnace melting chamber and, in that case, the molten material is solidified in such mold without the necessity of a pouring operation. The resulting monolithic castings or grain particles have a microstructure that is principally similar to the CaO-MgO eutectic structure due to the proximity of most compositions within this invention to the ideal eutectic composition. This generally involves periclase crystals dispersed in a CaO matrix similar in varying degrees to a typical eutectic arrangement. With the higher MgO contents, there is more and larger size periclase crystals occurring in a CaO matrix of lesser volume. Occasional random scattered islands of crystalline fluoride are observed within the matrix phase. Similarly, when $Cr_2O_3$ and/or $Fe_2O_3$ is included in the composition, occasional random scattered islands of a low melting point phase containing some of these oxides (e.g. one tentatively identified as $Ca_2MgFe_2O_6$ solid solution) are found in the matrix phase. Enlargement of the periclase crystals and the development of more periclase to periclase bonding is also apparent in the fused material that contains the additional densifying oxide.

Any of the usual good quality dolomite, magnesia, chrome ore or other raw materials suitable for refractory purposes and providing compositions within the limits specified above can be employed in the manufacture of the material according to this invention. The source of fluorine desirably is any suitable metal fluoride, such as alkaline earth metal fluoride and/or aluminum fluoride. Because of its lower costs, availability and chemical compatibility with the remainder of the refractory composition, calcium fluoride or fluorspar is preferably added to the batch mixture and premixed therewith prior to electrically melting the mixture. A certain amount of fluorine loss is inherent because of the volatility of the fluoride; however, we have found that such loss can be minimized by adding the calcium fluoride in a coarser form. Pellets of 1 to 1½ inch size have yielded an average of almost 80% fluorine retention whereas minus 65 Tyler mesh material has been found to yield an average of only about 36% fluorine retention. It is preferred to use calcined dolomite as the principal batch material. Any additional magnesia added to increase the MgO content is also preferably employed in the calcined state. The densifying oxide is most economically provided by additions of chrome ore with suitably low or moderate $SiO_2$ contents. Batch mixtures providing compositions for this invention involve relatively moderate melting temperatures for basic refractory material (e.g. 2200–2450° C.), which allows the material to be rather easily melted and readily cast into molds or formed into grain.

DESCRIPTION OF THE PREFERRED EMBODIMENTS

Example 1

Five fused refractory samples were prepared using raw dolomite having the following typical analysis, by weight: 30.6% CaO, 21.6% MgO, 0.25% $SiO_2$, 0.04% $Fe_2O_3$, 0.06% $Al_2O_3$ and 47.2% loss on ignition. One sample was made solely of this raw dolomite. The other four samples were made from mixtures of the raw dolomite and −65 mesh acid grade fluorspar having the following typical analysis, by weight: 97.3% $CaF_2$, 1.1% $CaCO_3$, 1.1% $SiO_2$ and 0.5% $Fe_2O_3$. One inch cubes of these melted and solidified samples were placed in an atmosphere heated to 100° F. (38° C.) and maintained at 100% relative humidity in order to determine their relative resistances to hydration under rather rigorous conditions. While maintained in this heated humid atmosphere, the cubes were observed for initial and complete failures with the number of hours elapsed from the beginning of the test to the occurrence of the failures being noted. Initial failure was the occurrence of a powdery coating on the surface of a cube or of a tight crack (i.e. no observable separation of the adjacent surfaces defining the crack). Complete failure was the occurrences of an open crack (i.e. observable separation of the adjacent surfaces defining the crack) or complete disintegration of the cube into a powder. Table I lists for each sample the amount of fluorspar in the batch mixture, the analyzed retained fluorine, and the number of hours elapsed for each type of failure.

TABLE I

| Sample No. | Wt. percent fluorspar batched | Wt. percent fluorine retained | Hours to failure Initial | Hours to failure Complete | Bulk density, lbs./ft.$^3$ |
|---|---|---|---|---|---|
| 1 | 0 | | 25 | 32 | |
| 2 | 1.9 | 0.21 | 41 | 89 | 179 |
| 3 | 5.6 | 0.37 | 49 | 89 | |
| 4 | 9.1 | 1.24 | 161 | 209 | 174 |
| 5 | 14.2 | 1.83 | 89 | 161 | |

From the above data, it can be seen that marked improvement in hydration resistance is provided by retained fluorine contents in the range of 0.15 to 3 wt. percent.

For economy and convenience, more complete actual chemical analysis was made only on Sample Nos. 3 and 5 and calculated analysis based on the batch dolomite material was made for Sample No. 1. These analyses are indicative of the similar analyses expected for the other samples. Table II sets forth the analyses on a weight basis, and the apparent minor discrepancy between the total sum of the analysis for any one sample and 100% is due to inherent minor inaccuracies that commonly result from individual analysis of each constituent and to ignoring the very minor impurity constituents (i.e. those not analyzed indicated by N.A.).

TABLE II

| Sample No. | CaO | MgO | SiO$_2$ | Fluorine | Fe$_2$O$_3$ | Al$_2$O$_3$ |
|---|---|---|---|---|---|---|
| 1 | 58.2 | 41.1 | 0.5 | | 0.1 | 0.1 |
| 3 | 54.7 | 42.9 | 0.75 | 0.37 | N.A. | N.A. |
| 5 | 56.1 | 41.98 | 0.73 | 1.83 | N.A. | N.A. |

Example 2

Five fused refractory samples were prepared using the raw dolomite of Example 1 and a Transvaal chrome ore having the following typical analysis, by weight: 44% Cr$_2$O$_3$, 23% FeO+Fe$_2$O$_3$, 13% Al$_2$O$_3$, 12% MgO, 4% SiO$_2$, 0.5% CaO and 0.4% TiO$_2$. Sample No. 6 was made from a mixture of 98 wt. percent raw dolomite and 2 wt. percent chrome ore. The other four samples were made from mixtures of 4 wt. percent chrome ore, varying amounts of the fluorspar of Example 1 and the balance raw dolomite. One inch cubes of each sample were tested for hydration by the procedure described in Example 1. Table III sets forth the results of these tests.

TABLE III

| Sample No. | Wt. percent fluorspar batched | Wt. percent fluorine retained | Hours to failure Initial | Hours to failure Complete | Bulk density, lbs./ft.$^3$ |
|---|---|---|---|---|---|
| 6 | 0 | | 19 | 24 | 177 |
| 7 | 1 | N.A. | 30 | 45 | |
| 8 | 3 | 0.36 | 54 | 102 | 205 |
| 9 | 5 | 0.53 | 69 | 102 | 205 |
| 10 | 8 | 0.63 | 45 | 77 | |

The above data demonstrates the distinct improvement in hydration resistance by virtue of the retained fluorine contents even when densifying oxides are present in the fused samples. Moreover, the marked increase in bulk density resulting from the inclusion of the densifying oxides (derived from the chrome ore) is also apparent.

Analyses of some of these samples are set forth in Table IV on a percent by weight basis (with Sample No. 6 being a calculated analysis based on the batch materials).

TABLE IV

| Sample No. | CaO | MgO | SiO$_2$ | Fluorine | Cr$_2$O$_3$ | Fe$_2$O$_3$ | Al$_2$O$_3$ |
|---|---|---|---|---|---|---|---|
| 6 | 57.1 | 40.5 | 0.6 | | 0.9 | 0.5 | 0.3 |
| 8 | 54.2 | 42.2 | 0.64 | 0.36 | 1.23 | 0.85 | 0.47 |
| 9 | 53.7 | 40.6 | 0.54 | 0.53 | 1.34 | 1.10 | 0.54 |

Example 3

A further series of samples were prepared by electric melting, and their batch mixtures and retained fluorine contents, in percent by weight, are set forth in Table V along with three samples of Example 2. In those batch mixtures where the dolomite percent value is followed by the symbol (1), a calcined dolomite was employed having the following typical analysis on a weight basis: 57.8% CaO, 41.2% MgO, 0.5% SiO$_2$, 0.2% Fe$_2$O$_3$, 0.15% Al$_2$O$_3$ and balance loss on ignition. For Sample Nos. 30 and 31 where the symbol (2) follows the percent value in the "Dolomite" column, that percent value is actually the sum of a mixture of raw dolomite as in Example 1 and calcined magnesia having a typical analysis as follows, by weight: 98.51% MgO, 0.86% CaO, 0.28% SiO$_2$, 0.22% Fe$_2$O$_3$ and the balance loss on ignition. Sample No. 30 employed raw dolomite in an amount of 65.1 wt. percent computed on a calcined basis and 27.9 wt. percent calcined magnesia. Sample No. 31 employed raw dolomite in an amount of 63.7 wt. percent computed on a calcined basis and 27.3 wt. percent calcined magnesia. In all other samples, the dolomite portion of the batch was the raw dolomite of Example 1. The TCO portion of the batch mixtures was Transvaal chrome ore as previously described in Example 2. Three different fluorspar (CaF$_2$) batch materials, of essentially the same composition as in Example 1, were employed. In those mixtures where the CaF$_2$ percent value is followed by the symbol (3), the fluorspar was pelletized as 1″ to 1½″ size granules and yielded better fluorine retention. In the four mixtures where the CaF$_2$ percent value is followed by the symbol (4), the fluorspar had particle sizes of ¼″ to ½″. All other sample mixtures employed the −65 mesh fluorspar.

Portions of each listed sample were subjected to a rigorous thermal shock test and a basic steelmaking slag corrosion test to determine relative resistances of the samples to each environmental factor.

The thermal shock resistance data (T.S. cycles) were determined by a test in which 1″ x 1″ x 3″ samples at room temperature are put into a furnace preheated to 1400° C., held in the furnace for 10 minutes to allow the samples to become uniformly heated, then pulled out into the air and held there for 10 minutes so that the samples become substantially cooled to room temperature. The procedure constitutes one cycle of the test and it is repeated until the samples fail by breaking into two or more pieces, at which time the total number of cycles performed are noted. In the case of Sample No. 11, the test was discontinued after 10 cycles with no breaking having occurred, which indicates the outstanding thermal shock resistance of the 100% dolomite fused material having the excessively punky core. Samples Nos. 6, 19, 29 and 32 had markedly increased bulk density by virtue of the chrome ore providing densifying oxide content, but their thermal shock resistances were drastically lowered. In contrast, all the other samples with retained fluorine contents, in addition to the densifying oxide content derived from the chrome ore, had significantly higher thermal shock resistances, thereby indicating the effectiveness of the retained fluorine to mitigate the adverse effect of the densifying oxide on such property.

TABLE V

| Sample No. | Batch mixture | | | Retained fluorine | Slag cut (in.) | Volume loss (in.³) | T.S. cycles |
|---|---|---|---|---|---|---|---|
| | Dolomite | TCO | CaF₂ | | | | |
| 11 | 100 | | | | 0.75 | | 10 |
| 6 | 98 | 2 | | | 0.80 | 2.39 | 1 |
| 12 | 96 | 2 | 2 | 0.35 | 0.50 | 0.97 | 2 |
| 13 | 94 | 2 | 4 | 0.71 | 0.50 | 1.02 | 3 |
| 14 | 93(1) | 2 | 5(3) | 2.73 | 0.71 | 2.16 | 2 |
| 15 | 92 | 2 | 6 | 1.20 | 0.44 | 0.87 | 3 |
| 16 | 88(1) | 2 | 10(3) | 4.64 | 0.62 | 1.91 | 3 |
| 17 | 78(1) | 2 | 20(3) | 7.2 | 0.82 | 2.46 | 7 |
| 18 | 68(1) | 2 | 30(3) | 10.3 | 1.64 | 4.50 | 4 |
| 19 | 97 | 3 | | | 0.55 | 1.41 | 2 |
| 20 | 92(1) | 3 | 5(4) | 1.31 | 0.34 | 0.61 | 3 |
| 21 | 87 | 3 | 10 | 2.14 | 0.63 | 1.70 | 5 |
| 22 | 87(1) | 3 | 10(3) | 3.75 | 0.70 | 2.20 | 6 |
| 23 | 82 | 3 | 15 | 3.48 | 0.73 | 1.68 | 4 |
| 24 | 82(1) | 3 | 15(4) | 5.02 | 0.56 | 1.07 | 4 |
| 25 | 82(1) | 3 | 15(3) | 5.15 | | | 5 |
| 26 | 77(1) | 3 | 20(3) | 7.0 | 0.92 | 3.01 | 6 |
| 27 | 77(1) | 3 | 20(4) | 7.06 | 0.47 | 2.03 | 5 |
| 28 | 67(1) | 3 | 30(4) | 11.5 | 2.01 | 5.64+ | 6 |
| 29 | 96 | 4 | | | 0.59 | 1.32 | 2 |
| 8 | 93 | 4 | 3 | 0.36 | 0.53 | 1.21 | 4 |
| 30 | 93(2) | 4 | 3 | 0.34 | 0.54 | 1.17 | 3 |
| 9 | 91 | 4 | 5 | 0.53 | 0.57 | 1.30 | 2 |
| 31 | 91(2) | 4 | 5 | 0.61 | 0.52 | 1.23 | 4 |
| 32 | 95 | 5 | | | 0.52 | 1.28 | 2 |
| 33 | 92 | 6 | 2 | 0.33 | 0.66 | 1.71 | 4 |

The basic slag resistance data of "Slag Cut" and "Volume Loss" were determined by a test that comprised forming a small circular furnace chamber of approximately 9½" diameter by assembling on a refractory base two tiered rings of truncated wedge shape refractory blocks forming a wall 3" thick and with their smaller truncated surfaces of 2½" width and 4½" height being the hot face defining the inside wall surface of the furnace chamber. The lower ring of blocks was made of the samples listed in Table V. After preheating the furnace chamber to about 1400° C., it was charged with about 6 kilograms of a representative basic oxygen furnace steelmaking slag batch having the following typical analysis by weight: 52.7% CaO, 21.2% SiO₂, 21.2% Fe₃O₄ and 4.9% Al₂O₃. This slag charge was quickly melted, rotation of the furnace at 4 to 5 r.p.m. was begun and flushing of the chamber with argon was started to maintain a neutral atmosphere therein. Over a period of two hours, the temperature of the molten slag (measured at the center of the batch) was increased from about 1400° C. to about 1950° C., after which the test was ended and the block samples removed when sufficiently cooled for handling. The linear depth of the deepest cut into each sample block was measured in inches and listed under "Slag cut." The corroded hot face of each sample block was also filled with sand up to the level of the original pretest surface configuration. This sand fill was then weighed and its volume in cubic inches computed from its weight and density values, which is listed under "Volume loss." From such data in Table V, it can be seen that reasonably good corrosion resistance is obtained when retained fluorine does not exceed 7. wt. percent.

A further representative indication of the analyses of the fused samples is shown by the selected sample analyses in Table VI. These analyses are in percent by weight.

TABLE VI

| Sample No. | CaO | MgO | SiO₂ | Fluorine | Cr₂O₃ | Fe₂O₃ | Al₂O₃ |
|---|---|---|---|---|---|---|---|
| 20 | 54.6 | 38.8 | 0.54 | 1.31 | 1.46 | 1.10 | 0.66 |
| 21 | 56.5 | 38.3 | 0.60 | 2.14 | 1.20 | 0.78 | 0.36 |
| 22 | 57.1 | 37.7 | 0.51 | 3.75 | 0.84 | 0.67 | 0.44 |
| 23 | 58.6 | 36.5 | 0.76 | 3.48 | 1.69 | 1.08 | 0.43 |
| 25 | 59.2 | 36.4 | 0.55 | 5.15 | 1.36 | 0.84 | 0.59 |
| 26 | 58.1 | 32.8 | 0.46 | 7.00 | 1.32 | 0.79 | 0.59 |
| 27 | 58.0 | 33.2 | 0.59 | 7.06 | 1.50 | 1.00 | 0.72 |
| 30 | 47.3 | 48.2 | 0.58 | 0.34 | 2.03 | 1.30 | 0.79 |
| 31 | 48.8 | 45.1 | 0.79 | 0.61 | 1.76 | 1.42 | 0.84 |

As used in the definition of the invention described herein, Fe₂O₃ is intended to include all the analytical iron content computed as if it were present in the form of Fe₂O₃, although some of the iron may actually be in another valence state or form, e.g. FeO.

We claim:
1. Basic fused refractory material analytically consisting of, by weight, 38 to 85% CaO, 10 to 59% MgO, at least 80% CaO+MgO, 0.15 to 11.5% fluorine, 0 to 10% of densifying oxide selected from the group consisting of Cr₂O₃, Fe₂O₃ and mixtures thereof, 0 up to less than 7% SiO₂, and 0 up to less than 10% Al₂O₃.

2. Basic fused refractory material of claim 1 wherein said densifying oxide is at least 0.5% by weight.

3. Basic fused refractory material of claim 2 wherein fluorine is 0.3 to 7% by weight.

4. Basic fused refractory material of claim 3 wherein said densifying oxide is not greater than 5% by weight and includes at least 0.5% by weight Cr₂O₃.

5. Basic fused refractory material of claim 1 wherein fluorine is 0.3 to 3% by weight.

6. Basic fused refractory material of claim 1 analytically consisting of, by weight, 50 to 75% CaO, 10 to 48% MgO, at least 91% CaO plus MgO, 0.3 to 7% fluorine, 0 to 8% densifying oxide selected from the group consisting of Cr₂O₃, Fe₂O₃ and mixtures thereof, 0 to 2% SiO₂, and 0 up to less than 3% Al₂O₃.

7. Basic fused refractory material of claim 6 wherein said densifying oxide is 0.5 to 4% by weight.

8. Basic fused refractory material of claim 6 wherein Cr₂O₃ is 0.5 to 4% by weight and Fe₂O₃ is 0.2 to 4% by weight.

9. Basic fused refractory material of claim 1 analytically consisting of, by weight, 38 to 65% CaO, 30 to 58% MgO, at least 91% CaO plus MgO, 0.3 to 7% fluorine, 0 to 5% densifying oxide selected from the group consisting of Cr₂O₃, Fe₂O₃ and mixtures thereof, less than 3% SiO₂, and less than 3% Al₂O₃.

10. Basic fused refractory material of claim 9 wherein Cr₂O₃ is 0.6 to 3% by weight and Fe₂O₃ is 0.5 to 2% by weight.

11. Basic fused refractory material of claim 1 analytically consisting of, by weight, 38 to 85% CaO, 10 to 59% MgO, at least 80% CaO+MgO and 0.15 to 11.5% fluorine.

12. Basic fused refractory material of claim 6 analytically consisting of, by weight, 50 to 75% CaO, 10 to 48% MgO, at least 91% CaO+MgO and 0.3 to 7% fluorine.

13. Basic fused refractory material of claim 9 analytically consisting of, by weight, 38 to 65% CaO, 30 to 58% MgO, at least 91% CaO+MgO and 0.3 to 7% fluorine.

References Cited

UNITED STATES PATENTS 2,310,591  2/1943  McMullen _____ 106—61
3,342,616  9/1967  Alper et al. _____ 106—60

JAMES E. POER, Primary Examiner

U.S. Cl. X.R.

106—59, 60, 61, 63

UNITED STATES PATENT OFFICE
CERTIFICATE OF CORRECTION

Patent No. 3,540,899   Dated November 17, 1970

Inventor(s) Allen M. Alper, Robert C. Doman and Robert C. Mc1

It is certified that error appears in the above-identified patent and that said Letters Patent are hereby corrected as shown below:

Column 2, line 55, before "gradients" insert --shock and/or conditions causing substantial thermal--.

Column 5, line 21 "fluorine" should be --fluorine--.

Signed and sealed this 23rd day of March 1971.

(SEAL)
Attest:

EDWARD M. FLETCHER, JR.
Attesting Officer

WILLIAM E. SCHUYLER, J
Commissioner of Patent